Feb. 18, 1958

M. G. MARQUARDT 2,823,923

FOLDING LAUNDRY CART

Filed Aug. 2, 1954

MARVIN G. MARQUARDT
INVENTOR.

BY

ATTORNEYS

United States Patent Office 2,823,923
Patented Feb. 18, 1958

2,823,923
FOLDING LAUNDRY CART

Marvin G. Marquardt, Lemon Grove, Calif.

Application August 2, 1954, Serial No. 447,135

2 Claims. (Cl. 280—36)

This invention relates to an improved laundry cart.

It is an object of this invention to provide a sturdy balanced laundry cart.

It is a further object of this invention to provide such a cart supported upon two wheels providing maximum mobility while retaining its balance and stability.

It is still a further object of this invention to provide a laundry cart wherein the center of gravity is positioned so that the load is applied to a single axle permitting use of a pair of wheels.

Other objects and advantages will be readily apparent from the following description.

Figure 1:
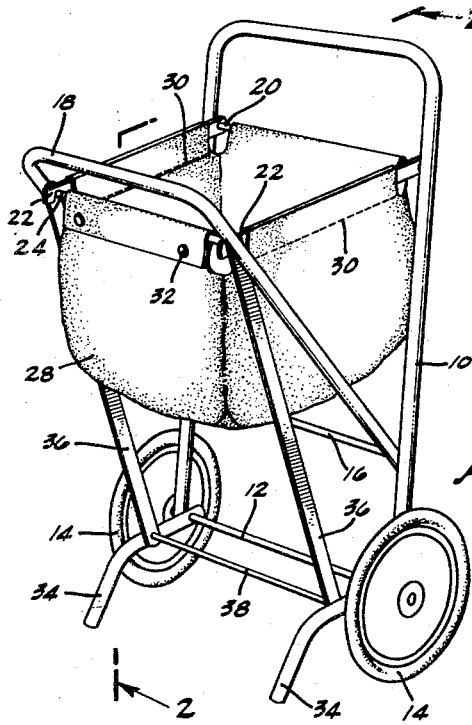
Figure 1 is a perspective view of the cart.
Figure 2:
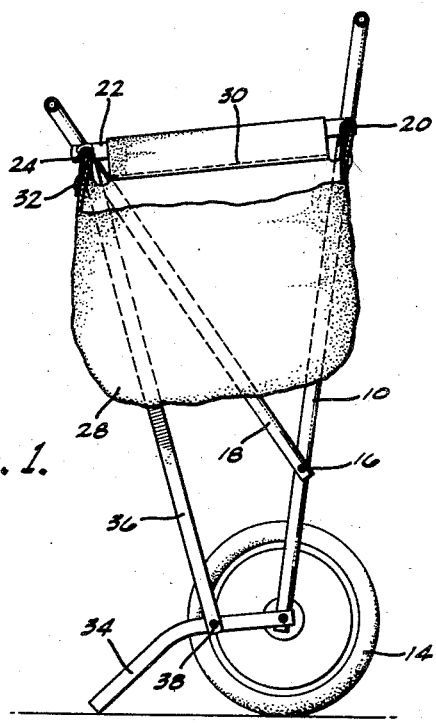
Figure 2 is a side elevation of the cart taken along line 2—2 of Figure 1.

The cart has a U-shaped rear frame 10 which supports at its lower extremity an axle 12, upon which wheels 14 are mounted. Positioned between the arms of frame 10 above axle 12 is a cross brace 16. The front frame 18 is similarly U-shaped and has holes in its arms near their extremities through which brace 16 projects pivotally mounting frame 18 on frame 10.

Positioned between the arms of frame 10 above cross brace 16 is upper brace 20. A pair of arms 22 have holes therein through which upper brace 20 passes pivotally mounting arms 22 on brace 20.

Figure 3:
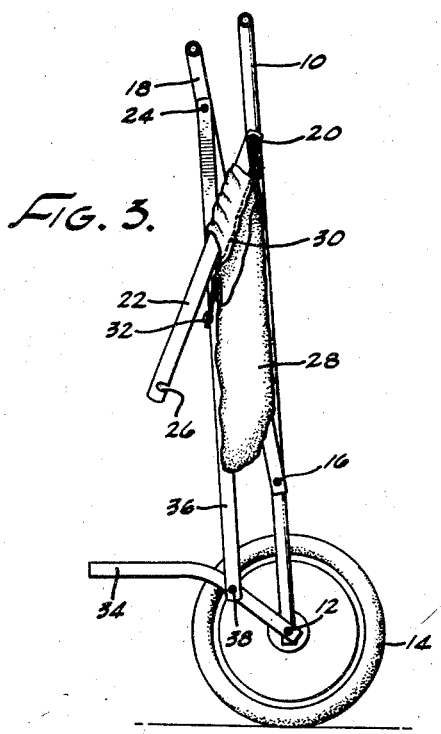
Figure 3 is a side elevation of the cart in the folded position.
Figure 4:
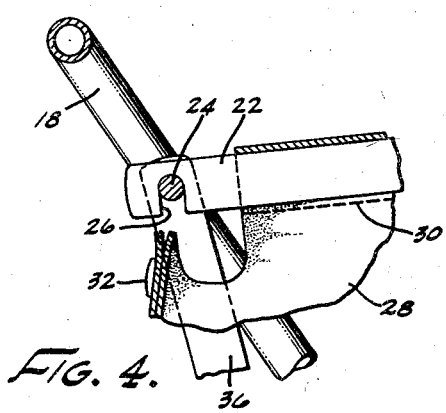
Figure 4 is a fragmentary side elevation of the frame connection.

The front frame 18 has an arm brace 24 supported between its arms and each arm 22 has a groove 26 which forms a hook at the end of the arms for engaging the brace 24 and spacing the front frame 18 from rear frame 10. When the hooks are disengaged from brace 24 the arms 22 are pivoted downwardly and frame 18 is pivoted towards frame 10, as seen in Figure 3, for storage.

A laundry bag 28 is preferably made of light canvas and hemmed as at 30 to receive arms 22 and has flaps which pass over braces 20 and 24, and has snaps as at 32 to secure same at the ends.

Projecting from the axle 12 are downwardly curved legs 34. The legs have holes therein through which the axle 12 passes and said legs project well in advance of the wheels 14 and are curved downwardly to engage the ground and support the cart when the user releases the handle or rear frame 10, by which the device is moved.

To add rigidity and balance to the structure bracing strips 36 are provided which at their upper extremities have holes through which brace 24 fits and at their lower extremities have similar holes through which rod 38 passes which rod is supported between legs 34.

While what hereinbefore has been described is the preferred embodiment of this invention, it is readily apparent that alterations and modifications may be resorted to without departing from the scope of this invention and such alterations and modifications are intended to be included within the scope of this invention.

I claim:

1. A laundry cart comprising: a frame, a handle formed on one extremity of said frame, a pair of wheels mounted upon the opposite extremity of said frame, a second frame having one extremity pivotally mounted to said first mentioned frame, a pair of arms pivotally mounted upon one of said frames releasably engaging the other frame and spacing the free extremity of said second frame said first mentioned frame, a laundry bag suspended between points adjacent the free extremity of said second frame and points adjacent the handle formed portion of said first mentioned frame, a pair of outwardly and downwardly projecting legs pivotally mounted to said first mentioned frame, and bracing means interconnecting said legs and said second frame whereby said legs pivot with said second frame.

2. A laundry cart comprising: a frame, a handle formed on one extremity of said frame, a pair of wheels mounted upon the opposite extremity of said frame, a second frame having one extremity pivotally mounted to said first mentioned frame, a pair of arms pivotally mounted upon one of said frames releasably engaging the other frame and spacing the free extremity of said second frame from said first mentioned frame, a laundry bag receiving said arms and releasably engaging each of said frames, a pair of outwardly and downwardly projecting legs pivotally mounted to said first mentioned frame, and bracing means interconnecting said legs and said second frame whereby said legs pivot with said second frame.

References Cited in the file of this patent

UNITED STATES PATENTS

| 1,769,418 | Cooper | July 1, 1930 |
| 2,393,149 | Cunningham | Jan. 15, 1946 |
| 2,472,407 | David | June 7, 1949 |